United States Patent [19]

Wegener et al.

[11] 3,886,532

[45] May 27, 1975

[54] INTEGRATED FOUR-PHASE DIGITAL MEMORY CIRCUIT WITH DECODERS

[75] Inventors: Horst A. R. Wegener, Carlisle, Mass.; Douglas R. Askegard, Minnetonka, Minn.

[73] Assignee: Sperry Rand Corporation, New York, N.Y.

[22] Filed: May 8, 1974

[21] Appl. No.: 467,968

[52] U.S. Cl. .............................. 340/173 R; 307/238

[51] Int. Cl. .............................................. G11c 11/40

[58] Field of Search ................. 340/173 R, 173 DR; 307/238

[56] References Cited

UNITED STATES PATENTS

| | | | |
|---|---|---|---|
| 3,719,932 | 3/1973 | Cappon | 340/173 R |
| 3,747,072 | 7/1973 | Lodi | 340/173 DR |
| 3,838,404 | 9/1974 | Heeren | 340/173 DR |

*Primary Examiner*—Terrell W. Fears

*Attorney, Agent, or Firm*—Howard P. Terry; Joseph M. Roehl

[57] ABSTRACT

A memory circuit includes an array of variable threshold field effect memory transistors of a known type, arranged in word rows and bit columns. The gate electrodes of all memory transistors in a given word-row are connected to a word-line common to that row. The source and drain electrodes of all memory transistors in a given bit-column are connected to source and drain lines, respectively, common to that column. Each word-line is coupled through an individual buffer transistor to a decoding matrix by means of which a selected word-line may be charged to a desired voltage level. The source and drain lines are connected to bit decoding networks by means of which the source and drain lines may be connected to predetermined voltages suitable for use in writing or interrogation. Writing voltages are applied to the circuit in a four-phase operating sequence. During the first phase, both the memory substrate and the transistor gates are charged to the same specified voltage level. In the second phase, the memory transistors in the selected word-line are set to their low threshold value so as to clear this word-line. During the third phase, the gates and substrates of the memory transistors are reduced to zero voltage; however, the sources and drains of the memory transistors are maintained at a relatively high voltage. During the fourth phase, the gates of the memory transistors in the selected row are driven negative while the remaining gates are maintained at zero voltage. If a binary ZERO is to be written into the addressed bit, the sources of all memory transistors in the corresponding row are grounded while the sources in the remaining bit columns are left in their charged state. If a binary ONE is to be written into the addressed bit, the sources and drains of all of the memory transistors are left in their charged state. Reading may be accomplished by applying voltages of a lower magnitude in the same four-phase sequence and adjusting the control voltages.

9 Claims, 2 Drawing Figures

INTEGRATED FOUR-PHASE DIGITAL MEMORY CIRCUIT WITH DECODERS

BACKGROUND OF THE INVENTION

1. Field of the Invention

This invention relates to digital memory circuits and more specifically to digital memory circuits employing variable threshold insulated gate field effect transistors.

2. Description of the Prior Art

Various memory circuits employing variable threshold field effect transistor memory cells are known in the art. In general, however, the power consumption in the prior art circuits is relatively large. Furthermore, if the circuit is designed for a large fan-in, the READ and WRITE cycle time must be increased significantly. The circuit of the present invention provides a combination of high speed, low power and relatively low cost not attainable in the known prior art circuits.

SUMMARY OF THE INVENTION

The circuit of the present invention utilizes a four-phase WRITE cycle in which the memory substrate and the gates of all memory transistors are charged to a specified voltage during the first phase. During the second phase, all of the memory transistors in the row containing the addressed transistor are set to their low threshold value. During the third phase, the gates of all memory transistors and the substrate are discharged without dissipating the charge on the sources and drains so as to provide "channel shielding" for each memory transistor. During the fourth phase, the sources of the memory transistors in the column containing the addressed transistor are grounded if that transistor is to be set at its high threshold value and all other sources are left in the channel shielding condition. If the addressed transistor is to be maintained at its low threshold value, all sources are grounded.

DESCRIPTION OF THE PREFERRED EMBODIMENT

U.S. Pat. No. 3,590,337 "Plural Dielectric Layered Electrically Alterable Non-Destructive Readout Memory Element", issued by Horst A. R. Wegener and assigned to the present assignee, concerns a variable threshold memory cell in the form of an insulated gate field effect transistor. In this device, the gate electrode is separated from the substrate by a dielectric having at least two layers. These layers have different non-linear conductivities. The abrupt change of conductivity within the combined dielectric permits charge storage that can be utilized to perform memory functions.

The conduction threshold in such transistors is established by applying WRITE voltages (typically in the order of 30 volts) between the gate and substrate of the transistor. If the gate is driven positive with respect to the substrate, the transistor will be set at a relatively positive or "low" threshold and the transistor may be considered as storing a binary ONE. If the gate is driven negative with respect to the substrate, the transistor will be set at a relatively negative or "high" threshold and the transistor can be considered as storing a binary ZERO.

Assuming p-channel variable threshold transistors are used in the memory circuit, negative writing pulses will be applied to the gate electrodes to interrogate the device. Under these conditions, a conducting channel will be available between the source and drain when the transistor is storing a binary ONE, but not when the transistor is storing a binary ZERO.

The present invention further makes use of a "channel shielding" technique for writing information into a variable threshold memory transistor. This technique was disclosed in U.S. Pat. No. 3,618,051 "Non-Volatile Read-Write Memory With Addressing", issued to Robert E. Oleksiak and assigned to the present assignee. In accordance with this technique, information is written into a variable threshold transistor by first applying a gate-substrate preset voltage suitable for forming a conducting channel between the source and drain electrodes of the transistor. If the information to be written into the transistor requires that the threshold be reversed, the conducting channel is effectively clamped to the substrate when the WRITE voltage occurs. This permits the full WRITE voltage to be applied across the gate dielectric. If the information to be written into the transistor is such that the threshold should not be reversed, the conducting channel is clamped to a voltage smaller than the WRITE voltage. This effectively shields the gate dielectric from the substrate voltage and only a portion of the WRITE voltage, insufficient to shift the conduction threshold, appears across the gate dielectric.

Figure 1:
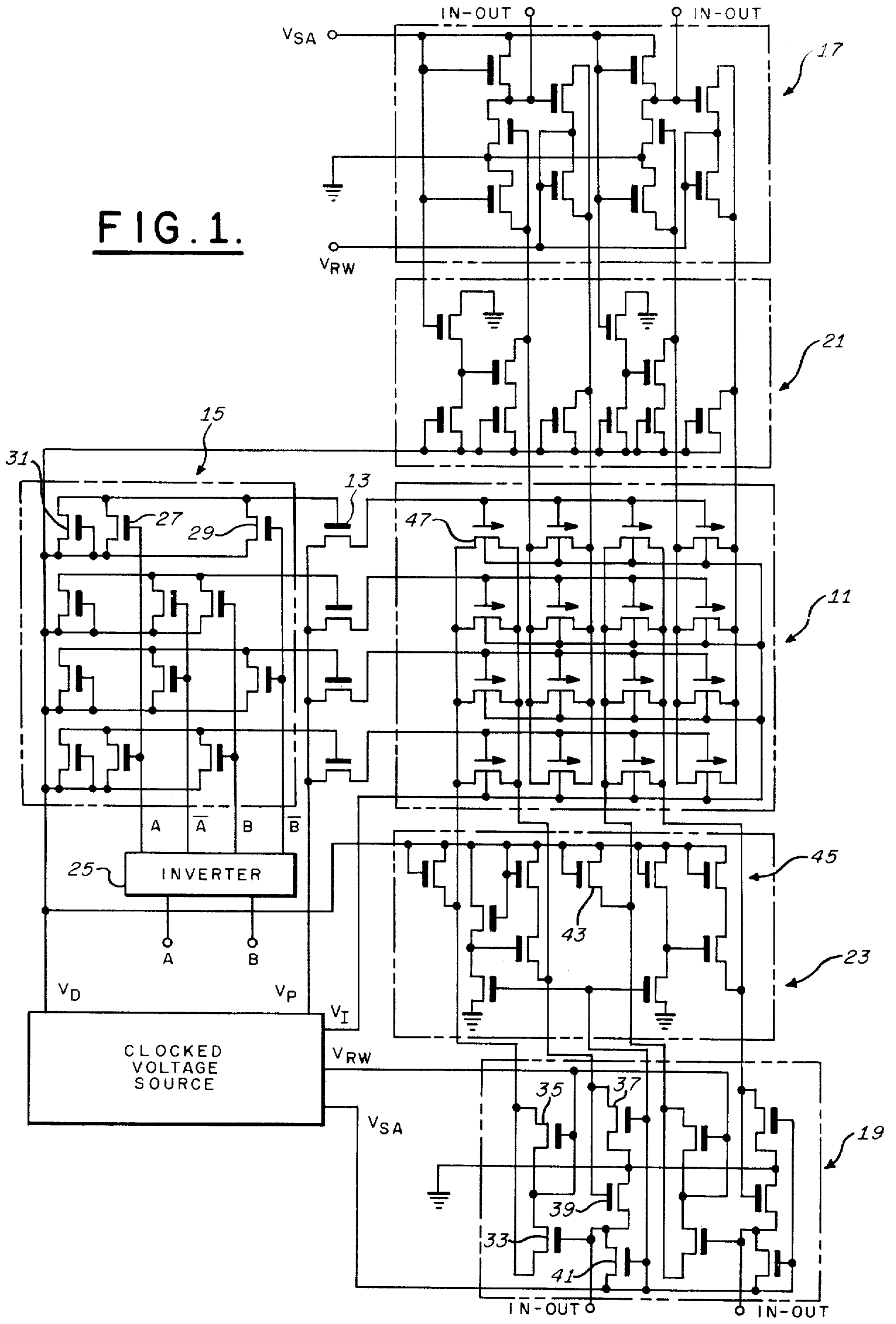
FIG. 1 is a circuit diagram illustrating a presently preferred embodiment of the invention.

The circuit of the invention is shown schematically and in simplified form as a four-bit by four-word memory with full decoding and interface circuitry in FIG. 1. It will be understood that in actual practice, the layout depicted in FIG. 1 would be logically expanded so as to include, for example, a 16-bit by 64-word organization.

The variable threshold memory transistors in the memory 11 are represented by transistors having arrows on the gate electrodes. All remaining transistors in the circuit are straight-forward fixed threshold transistors. The bit-lines consist of one memory transistor for each word connected in parallel with the others. Thus all memory transistors in a given bit-line have common sources and common drains. The memory transistors are accessed through their gate electrodes; the gates that are connected to the same line represent a word line. Each word line is coupled to a supply voltage $V_P$ through a buffer gate transistor such as the transistor 13. The buffer gate transistor is actuated by the stored charge occurring in the corresponding row of a word-line decoder 15. Voltages are steered to appropriate source and drain lines by means of the bit-line decoders 17 and 19 through source and drain charging circuits 21 and 23, respectively.

A given word is selected by applying an appropriate address signal to the terminals A and B. The value of each bit in the selected word is read into or out of the memory through the in-out terminals as permitted by control voltages $V_D$, $V_P$, $V_{SA}$, $V_{RW}$ and $V_I$.

The inverter circuit 25 is a conventional circuit for converting a binary address signal applied to the input terminals A and B into the corresponding two-rail signal. Thus, if a particular binary address signal consisted only of a voltage applied to the input terminal B, the inverter would provide output signals at its B and $\overline{A}$ terminals. The word-line decoder contains an individual multiple NOR gate corresponding to each word row in the memory array. Thus the uppermost multiple NOR gate in the decoder 15 includes the transistors 27 and 29. Each NOR gate is further shunted by a charging transistor such as the transistor 31 which is actuated by the decoder control voltage $V_D$ so as to shunt each multiple NOR gate with a low resistance during the occurrence of a $V_D$ pulse.

The decoder 15 is connected so that a different one of the multiple NOR gates will be open-circuited for each possible combination of input address signals. A given multiple NOR gate is considered to be addressed when it is in this open-circuited condition. Thus, for example, the uppermost multiple NOR gate would be addressed in the case of the previously cited example wherein an address signal was applied only to the input terminal B.

Each multiple NOR gate contains a decoder output line connected to the gate electrode of the corresponding buffer transistor. The buffer transistors are connected so that a negative voltage on the associated decoder output line acts to turn on the buffer transistor and thus apply a $V_P$ to the gate electrodes of all memory transistors in the associated word row of the memory array 11.

Individual bit columns in the memory array are addressed through identical bit-line decoders 17 and 19. The bit-line decoders are actuated in response to $V_{RW}$ and $V_{SA}$ mode command voltages which are adjusted for READ or WRITE operation as will be explained. Individual bits of information are read into or out of the circuit through an in-out terminal corresponding to each bit column.

A source line input transistor is connected to be turned on by a high level WRITE signal applied to the associated in-out terminal so as to couple a $V_{RW}$ voltage to the source line in response to such a signal.

A second source line transistor couples the source line to a negative $V_{RW}$ voltage during READ operations.

The common drain line of the same bit column may be optionally grounded during the occurrence of a $V_{SA}$ pulse. A bit-line decoder output transistor 39 serves to couple information from the addressed memory transistor to the appropriate in-out terminal during READ operations. A precharging transistor 41 serves to couple a $V_{SA}$ pulse to the output transistor immediately prior to the readout of a bit of information.

As can be seen from FIG. 1, the bit-line decoders 17 and 19 contain similar transistor networks for each bit column.

Each source line is coupled to the $V_D$ voltage through a source line charging transistor 43 in the source and drain charging circuits. A transistor network 45 couples the drain line to the $V_D$ voltage in the absence of a $V_{SA}$ pulse. The same network 45 does not couple the drain line to the $V_D$ voltage during the occurrence of a $V_{SA}$ pulse, thus allowing transistor 37 in the bit-line decoders to discharge the drain line to ground.

As in the case of the bit-line decoders, it will be noticed that the source and drain charging circuits 21 and 23 contain transistor networks identical with those just described for each bit column in the memory array.

Figure 2:
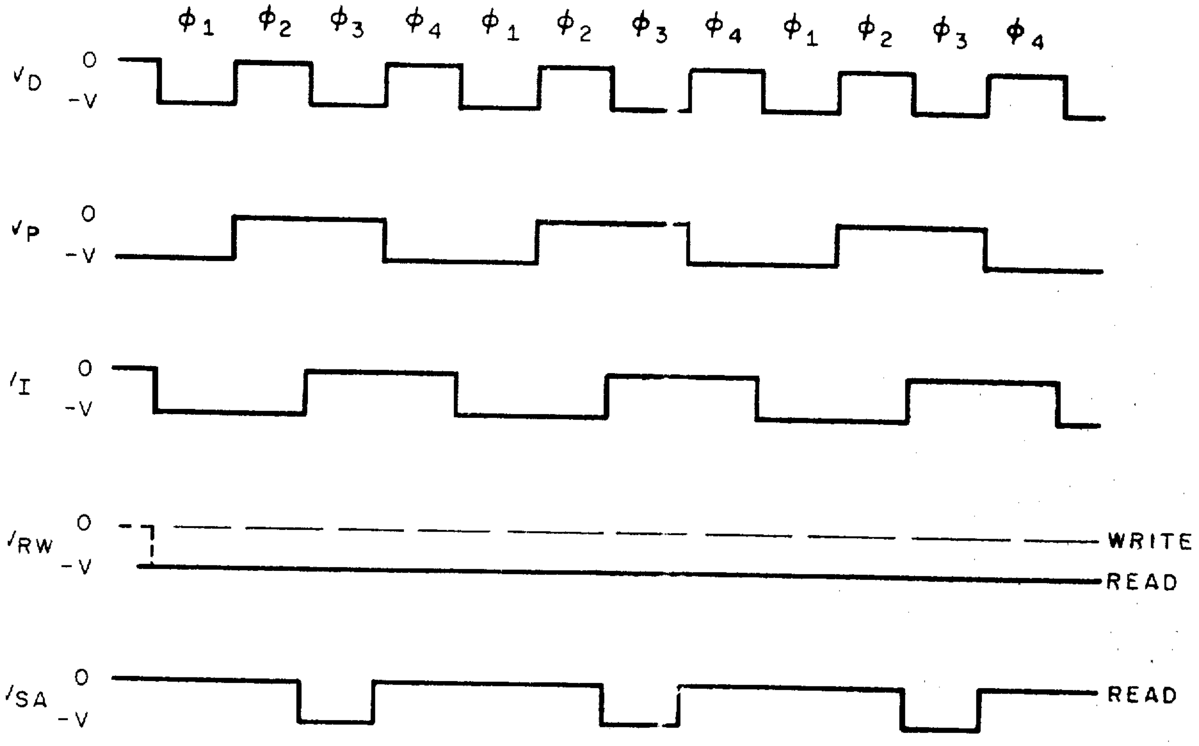
FIG. 2 is a timing diagram illustrating the sequence in which voltages are applied to the circuit of FIG. 1.

The manner in which information may be written into or read out of the memory array may be understood by referring to the circuit diagram of FIG. 1, together with the timing diagram of FIG. 2 which illustrates the variations of the control voltages $V_D$, $V_P$ and $V_I$ during several cycles of the operating sequence. FIG. 2 further illustrates the nature of the $V_{RW}$ and $V_{SA}$ voltages for the READ and WRITE function during the same operating cycles.

Assume by way of example that information is to be written into the memory transistor 47 in the top word row and left hand bit column of the memory array 11. The voltages $V_{RW}$ and $V_{SA}$ will be held at their zero level throughout the operating sequence in order to perform the WRITE function. An address signal will be applied to the B terminal of the inverter so as to turn on one of the transistors in each of the multiple NOR gates except the uppermost (addressed) NOR gate.

During phase 1, each of the control voltages $V_D$, $V_P$ and $V_I$ are at their negative level. The decoder control voltage $V_D$ turns on the charging transistor in each multiple NOR gate including the charging transistor 31 in the addressed NOR gate. This drives each decoder output line to a negative level and thereby turns on each buffer gate transistor. Since the control voltage $V_P$ is negative at this time, the gate electrodes of all memory transistors in the array are driven to their negative WRITE voltage level at this time. However, since the substrate voltage $V_I$ is also negative at this time, it will act through the forward biased source and drain diodes to charge all sources and drains in the memory transistor array to a negative voltage and no net voltage will be applied across the gate dielectric of any of the memory transistors. Furthermore, since the decoder control voltage $V_D$ is also applied to the source line charging transistors and the transistor network in the source and drain charging circuits, the source and drain electrodes of all memory transistors will also be driven negative by $V_D$. Thus, at the end of phase one, all electrodes of all memory transistors are at a negative voltage level.

Phase two constitutes a "clear" operation which serves to switch all memory transistors in the addressed word line to their positive threshold value. During phase 2, the decoder control voltage $V_D$ returns to a zero voltage level, thus turning off all charging transistors in the word line decoder and returning the lower bus in each of the multiple NOR gates to a zero voltage level. The decoder output line in each of the non-addressed multiple NOR gates will also be returned to the zero voltage level through the conducting transistor in that NOR gate. However, the decoder output line in the addressed NOR gate will remain charged to a negative voltage level. Consequently, the buffer gate transistor corresponding to the addressed word line will remain in a conducting condition whereas all other buffer gate transistors will be turned off. Since the gate control voltage $V_P$ returns to a zero voltage level during phase 2, the gate electrodes of the memory transistors in the addressed word row will be discharged through the conducting buffer gate transistor at this time. On the other hand, since all buffer gate transistors in the non-addressed word lines are non-conducting during phase 2, a negative charge will remain on the gate electrodes of all memory transistors in the non-addressed word lines.

During phase 2, the substrate voltage $V_I$ remains at a negative voltage. Therefore, an inverse WRITE voltage will be applied to all memory transistors in the addressed row, thus setting these transistors to their low threshold value, whereas all memory transistors in the non-addressed word lines will experience no net gate-substrate voltage. The source and drain lines of the memory transistors are effectively isolated during phase 2 so that the source and drain electrodes of all memory transistors will remain charged to a negative level.

During phase 3, the gate and substrate voltages of all memory transistors are returned to zero level without disturbing the low threshold setting of the addressed transistors. This is accomplished by returning the decoder control voltage $V_D$ to a negative level so as to turn on all charging transistors in the word line decoder and thus drive all decoder output lines negatively so as to turn on all buffer gate transistors. The gate control voltage $V_P$ remains at the zero voltage level during phase 3 and thus the charge on all of the gate electrodes in the memory array is returned to a zero level. The substrate voltage $V_I$ returns to the zero level during phase 3 so that the substrate is also discharged to the zero voltage level. The drain and source electrodes of all bit columns are maintained at a negative level through the decoder voltage $V_D$ during this operational phase.

Selective writing occurs during phase 4. During phase 4, the decoder control voltage $V_D$ returns to a zero voltage so that only the decoder output line associated with the addressed multiple NOR gate retains a negative charge and only the corresponding buffer gate transistor remains turned on. The gate control voltage $V_P$ returns to a negative value during phase 4 and thus drives the gate electrodes of the memory transistors in the addressed word row to a negative level without affecting the discharged condition of the gate electrodes in the non-addressed word rows. During phase 4, the substrate voltage $V_I$ remains at a zero level. Thus the memory transistors in the non-addressed word rows experience no gate-substrate voltage during phase 4 whereas the memory transistors in the addressed word row are subjected to a WRITE voltage sufficient to set these transistors to their negative threshold value. An addressed transistor is either permitted to shift its conduction threshold in response to the applied gate-substrate voltage, or inhibited from doing so by means of the aforementioned channelshielding technique in accordance with the bit of information to be written into the particular memory transistor.

Information is written into a particular memory transistor through the in-out terminal associated with the bit column including that transistor.

Assume that a binary ONE is to be written into memory transistor 47 and that this binary value is considered to be stored in a memory transistor when the transistor is set at its low threshold value as established during the "clear" operation of phase 2. In other words, a binary ONE will be stored in the transistor 47 if this transistor is inhibited from a shift in threshold during phase 4.

During phases 1 and 2, the substrate voltage $V_I$ was at a high negative level and all sources and drains on that isolation substrate were charged up to a negative voltage. This charge was retained during phase 3 when the decoder control voltage $V_D$ again applied a negative voltage to the source and drain lines so that the negative charge on these elements did not drain off when the substrate voltage became zero during phase 3. At the inception of phase 4, therefore, all bits exist under a condition of "channel-shielding" wherein the negative charge on these elements prevents the full WRITE voltage from being applied across the gate dielectric and thus inhibits a shift in conduction threshold.

Therefore, if a binary ONE is to be entered into memory transistor 47 during phase 4, a zero level voltage will be applied to the associated in-out terminal. The voltages $V_{RW}$ and $V_{SA}$ applied to the bit-line decoder 19 are at a zero voltage level; therefore, the transistors in the bit line decoder are all non-conducting with the exception of transistor 39 which is conducting since the drain line is negatively charged. Since the decoder control voltage $V_D$ is at a zero level during phase 4, the transistors in the source and drain charging circuit 23 are also non-conducting. Thus the source and drain lines in the bit column containing the memory transistor 47 are isolated from external voltage sources and the negative gate voltage applied to the memory transistor 47 is prevented from shifting the conduction threshold of that transistor, thereby permitting the transistor to remain in its "cleared" or low threshold state.

If a binary ZERO is to be entered into the transistor 47, a high level voltage will be applied to the associated in-out terminal. This will turn on the source line input transistor 33 and couple the associated source line to the zero voltage level of $V_{RW}$ so as to discharge the source line to the zero voltage level of the substrate. This permits the full WRITE voltage to be applied across the gate dielectric of the memory transistor 47. The conduction threshold of the transistor 47 will thereby be shifted to its high threshold level which constitutes the storage of a binary ZERO.

Since the remaining memory transistors in the same bit column receive no gate voltage during phase 4, these transistors are unaffected at this time.

Since the high level input signal affected only the source and drain lines of the column containing the memory transistor 47, the remaining transistors in the addressed word row remained in the channel-shielding condition wherein their conduction threshold was unaffected by the applied gate voltage.

Information may be read out of the memory array by applying the control voltages $V_D$, $V_P$ and $V_I$ in the same sequence but at a lower amplitude. The bit-line decoder voltage $V_{RW}$ is maintained at a negative level throughout the READ operation. The voltage $V_{SA}$ is maintained at a zero voltage level except during phase 3 wherein this voltage is switched to a negative level.

The negative $V_{RW}$ voltage maintains the source line transistors such as the transistor 35 in a conducting condition and therefore maintains all source lines at a negative level throughout the READ sequence.

The transistor networks such as the network 45 in the source and drain charging circuit 23, couple the drain lines to the negative decoder voltage source $V_D$ during phase 1. The same network couples the associated drain line to the negative level $V_D$ in the absence of a $V_{SA}$ pulse during phase 3 of a READ cycle.

During phase 1, the decoder control voltage $V_D$ and substrate voltage $V_I$ will be at their negative values and operate through the source and drain charging circuits, and the forward biased source and drain diode functions to charge all sources and drains in the memory array to a negative voltage.

Phase 2 of the READ cycle constitutes a "restore" operation rather than a "clear" operation in that the gate-substrate voltages applied to the addressed row of memory transistors counteracts the slight disturbance occasioned by the actual reading done with a negative interrogation voltage during the 4th phase of the READ cycle. Since the memory transistors in the non-addressed word lines are isolated from the $V_P$ control voltage during phase 2, the non-addressed transistors are unaffected by the "restore" conditions.

During phase 3, the decoder control voltage $V_D$ goes negative and acts through the drain charging transistors 43 to maintain the drains of the memory transistor array at a negative level, whereas the gate control voltage $V_P$ remains at a zero level. This permits all gate transistors in the memory array to discharge to the zero level while at the same time the substrate voltage $V_I$ goes to a zero level so that effectively no external voltage is applied to the gate dielectric of any of the memory transistors at this time. During phase 3, however, a negative $V_{SA}$ voltage pulse is applied to the bit-line decoders. This precharges the in-out contact capacitances, turns on the precharging transistors such as the transistor 41 in the bit-line decoder 19. The negative $V_{SA}$ pulse also turns on the grounded transistor in the transistor inverter network of the source and drain charging circuits 23, so as to prevent premature discharging of the output capacitances.

Actual readout occurs during phase 4 of the operating cycle when the decoder control voltage $V_D$ returns to zero voltage level. The decoder output line of only the addressed multiple NOR gate retains a negative charge and only the corresponding buffer gate transistor remains conductive. The gate control voltage $V_P$ again becomes negative during phase 4. Furthermore, the substrate voltage $V_I$ remains at zero level during phase 4 so that a negative gate voltage of READ magnitude is applied across the gate dielectric of all memory transistors in the addressed row during phase 4.

The source lines of all bit columns are maintained at a negative level during phase 4 by virtue of the $V_{RW}$ voltage applied to the bit-line decoders. If the conduction threshold of a memory transistor in a given bit column and addressed word row is at its low value so that the transistor is storing a binary ONE, the READ voltage applied between the gate and substrate of that transistor will permit current from the negative source line to flow through the memory transistor and turn on the corresponding bit line output transistor such as the transistor 39. This connects the associated in-out line to ground potential. Thus a stored binary ONE bit is evidenced by the lack of a negative level during phase 4.

If, on the other hand, the conduction threshold of the address memory transistor had been at its high level so that the memory transistor was storing a binary ZERO, the applied READ voltage would not drive the memory transistor into conduction. The output transistor 39 would remain non-conducting and the precharge accumulated during phase 3 would maintain the in-out terminal at a negative voltage during phase 4.

It will be appreciated that reading could be accomplished by merely repeating the 3rd and 4th phases and thus dispensing with the "restore" feature.

It will be noticed that the full 4-phase READ sequence delays the actual readout until the 4th phase of that sequence. In some situations, it may be desirable to read information out of the memory before the occurrence of the 4th phase without sacrificing the advantages of a "restore" function. This may be accomplished by providing a slightly more complicated source of control voltages which would effectively invert the gate control voltage $V_P$ and the substrate control voltage $V_I$ during a READ sequence. In such an arrangement, the source of $V_{SA}$ pulses applied to the bit-line decoder 19 would also be modified so that the negative-going pulses appeared during phase 1 rather than phase 3 of the READ sequence. Effectively, this scheme interchanges the "restore" and READ functions in that actual readout is obtained during phase 2 of the READ cycle and the restore function is performed during phase 4 of the READ sequence.

It will be noted that the memory circuit of the present invention is designed to have no steady-state currents. The circuit is also designed so that the majority of the power dissipated is that used in charging and discharging capacitances. Furthermore, the address inverter circuits and drain pull-up circuits dissipate power in transistors which are used as load resistors when appropriate address line or $V_{SA}$ and $V_D$ are negative. These factors combine to produce a circuit having unusually low power requirements.

The speed of the circuit is enhanced by the use of the $V_{SA}$ voltage pulses to precharge the in-out contact capacitance just prior to the readout function. Similarly, the use of low resistance buffer gate transistors in conjunction with the word-line decoder contributes significantly to the high speed operation of the memory circuit.

The circuit permits a fan-in of the order of 50 while still permitting a READ or WRITE cycle time in the order of 1–10 microseconds.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A digital memory circuit of the type employing variable threshold insulated gate field effect memory transistors arranged in word rows and bit columns on a common substrate, each of said memory transistors including gate, source and drain electrodes, said circuit comprising:

a clocked voltage source for supplying READ and WRITE sequential pulse trains to components in said memory circuit, word line decoder means, individual buffer transistor means for applying gate control voltages from said clocked voltage source to corresponding word rows of memory transistors in response to output signals from said word line decoder means, bit line decoder means for selectively intercoupling individual bit columns of said memory array with external utilization circuits, said clocked voltage source including means to apply decoder control voltages and substrate control voltages to said word line decoder and said common substrate, said word line decoder means including means for turning on all of said buffer transistors in response to a decoder control voltage from said clock voltage source, said decoder means further including means response to a received address signal for temporarily retaining a specified buffer transistor in a conducting condition after the termination of a decoder control voltage, said specified transistor being uniquely determined by the value of said address signal, whereby only the addressed word line receives a gate control voltage during such temporary retention times, said clock voltage source being arranged to provide gate control voltages and substrate control voltages of opposite polarity during such temporary retention times, said clocked voltage source further being arranged to produce gate control and substrate control voltages during a WRITE sequence in which the differential pulse magnitudes are sufficient to shift the conduction threshold of the memory transistors whereby the binary state of the transistors in the word row corresponding to said address signal may be reversed during such temporary retention times.

2. The memory circuit of claim 1 wherein the clocked voltage source is constructed to provide a four-phase WRITE sequence in which decoder control voltages are produced only during the first and third of such phases so that said temporary retention times occur during the second and fourth of such phases, said clocked voltage source being further constructed so that the polarities of the gate control and substrate control voltages produced during the fourth phase are the reverse of the polarities produced during the second phase whereby the conduction thresholds of the memory transistors in the addressed word row may be shifted to one value during phase 2 and may be shifted to the opposite value during phase 4.

3. The memory circuit of claim 2 further containing means to couple decoder control voltages to the common source and drain lines of each bit column during the first and third phases of said WRITE sequence whereby the source and drain elements of all memory transistors become charged to a predetermined voltage during these phases, said memory circuit having sufficient capacitance so that the charge thus acquired by the common source and drain lines may be retained during the succeeding second and fourth phases respectively, said memory circuit further being characterized in that the clocked voltage source produces decoder control voltages and substrate control voltages of the same polarity during said first phase of the WRITE sequence so that the common source and drain lines and the substrate are charged to voltages of the same polarity during the first phase of the WRITE sequence and to voltages of the opposite polarity during the third phase of that sequence.

4. The memory system of claim 3 wherein said bit line decoding means includes individual in-out terminals corresponding to each bit column in the memory array for receiving WRITE signals during the fourth phase of said WRITE sequence, said bit line decoding means further including individual switching means corresponding to each in-out terminal for discharging the common source line in the corresponding bit column in response to a received WRITE signal having a first binary value opposite to that stored in the addressed memory transistor during the second phase of the WRITE sequence, said switching means further being arranged to permit retention of the charge on the associated common source line upon receipt of a WRITE pulse of opposite binary value.

5. The memory circuit of claim 4 wherein each switching means in said bit line decoder means includes first switching transistor means used only during a WRITE sequence and second switching transistor means used only during a READ sequence, and wherein said clocked voltage source further includes means for providing mode command signals for selectively actuating said switching transistor means.

6. The memory circuit of claim 5 wherein the READ sequence consists of a four-phase sequence in which the gate control and substrate control voltages are applied in the same sequence as the corresponding WRITE sequence but at a reduced magnitude insufficient to cause shifting of the conduction threshold of the memory transistors.

7. The memory circuit of claim 6 wherein the clocked voltage source includes means for providing a first negative mode command signal throughout the READ sequence and means for providing a second mode command signal consisting of a negative pulse during the third phase of the READ sequence, each of said second switching transistor means in the bit line decoder means including a transistor arranged to clamp the source line of the associated bit column to the level of the negative mode command signal during the entire READ sequence, each of said second switching means further including means for precharging transistors in that switching transistor means in response to the pulsed second mode command signal, and means for conditionally dissipating such precharge during the fourth phase of the READ cycle as determined by the value of the information stored in the addressed memory transistor.

8. The memory circuit of claim 9 wherein the READ sequence is a two-phase sequence in which the decoder control voltage consists of a negative pulse occurring only throughout the first phase, the gate control voltage consists of a negative pulse occurring during the second pulse and the substrate control voltage is maintained at zero level throughout the READ sequence, said gate control voltage having a magnitude insufficient to shift the conduction threshold of the memory transistors.

9. The memory circuit of claim 5 wherein the READ sequence is a four-phase sequence in which the decoder control voltage consists of negative pulses occurring during the first and third phases, the gate control voltage consists of negative pulses occurring during the first and fourth phases, and the substrate control voltage consists of a negative pulse occurring throughout the first and second phases, said gate control and substrate control voltages having magnitudes insufficient to shift the conduction threshold of the memory transistors.

* * * * *